United States Patent
Her et al.

(10) Patent No.: US 11,101,547 B2
(45) Date of Patent: Aug. 24, 2021

(54) ANTENNA APPARATUS AND WIRELESS COMMUNICATION DEVICE USING SAME

(71) Applicant: Chiun Mai Communication Systems, Inc., New Taipei (TW)

(72) Inventors: Yih-Shyang Her, New Taipei (TW); Yun-Jian Chang, New Taipei (TW); Chien-Hua Li, New Taipei (TW); Wei-En Hsieh, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 16/522,776

(22) Filed: Jul. 26, 2019

(65) Prior Publication Data

US 2020/0036084 A1  Jan. 30, 2020

(30) Foreign Application Priority Data

Jul. 27, 2018 (CN) .......................... 201810846445.X

(51) Int. Cl.
*H01Q 1/24* (2006.01)
*H01Q 1/48* (2006.01)
*H04M 1/02* (2006.01)

(52) U.S. Cl.
CPC ............. *H01Q 1/243* (2013.01); *H01Q 1/48* (2013.01); *H04M 1/026* (2013.01)

(58) Field of Classification Search
CPC .......... H01Q 1/243; H01Q 1/48; H04M 1/026
See application file for complete search history.

(56) References Cited

U.S. PATENT DOCUMENTS

| | | | |
|---|---|---|---|
| 9,935,359 B2 | 4/2018 | Kim et al. | |
| 10,389,857 B2 | 8/2019 | Sun et al. | |
| 2016/0365623 A1* | 12/2016 | Kim | H01Q 9/42 |
| 2018/0026334 A1* | 1/2018 | Chen | H01Q 9/42 343/702 |
| 2018/0026337 A1 | 1/2018 | Chen et al. | |
| 2018/0026343 A1 | 1/2018 | Lee et al. | |
| 2018/0375971 A1* | 12/2018 | Sun | H01Q 1/243 |
| 2020/0058992 A1* | 2/2020 | Wu | H01Q 5/35 |

FOREIGN PATENT DOCUMENTS

| | | |
|---|---|---|
| CN | 105514604 A | 4/2016 |
| CN | 106252829 A | 12/2016 |
| CN | 205960191 U | 2/2017 |
| CN | 107681251 A | 2/2018 |
| WO | 2017/101068 A1 | 6/2017 |
| WO | 2018/090295 A1 | 5/2018 |

* cited by examiner

*Primary Examiner* — Yuwen Pan
*Assistant Examiner* — Umair Ahsan
(74) *Attorney, Agent, or Firm* — ScienBiziP, P.C.

(57) ABSTRACT

An antenna apparatus sited within a metal housing with improved frequency isolation between individual antennas includes the housing, a first ground portion, a first feed portion, and a second ground portion. A side frame of the housing defines at least one gap, the gap separates a first antenna and a second antenna. The first ground portion is formed by extending an end of the first antenna away from the gap. One end of the second ground portion is connected to the first feed portion, other end of the second ground portion is connected to ground. A first feed point feeds power and signal to the first antenna. A wireless communication device using the antenna apparatus is also provided.

18 Claims, 8 Drawing Sheets

US 11,101,547 B2

ANTENNA APPARATUS AND WIRELESS COMMUNICATION DEVICE USING SAME

FIELD

The subject matter herein generally relates to an antenna apparatus and a wireless communication device using the antenna apparatus.

BACKGROUND

Metal housings, for example, metallic backboards, are widely used for wireless communication devices, such as mobile phones and personal digital assistants (PDAs). Antennas are important components in wireless communication devices for receiving and transmitting wireless signals at different frequencies. However, when the antenna is located in the metal housing, the antenna signals are often shielded by the metal housing. This can degrade the operation of the wireless communication device. Additionally, the metallic backboard generally defines slots or/and gaps thereon, which will affect integrity of signals and aesthetics of the device.

Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
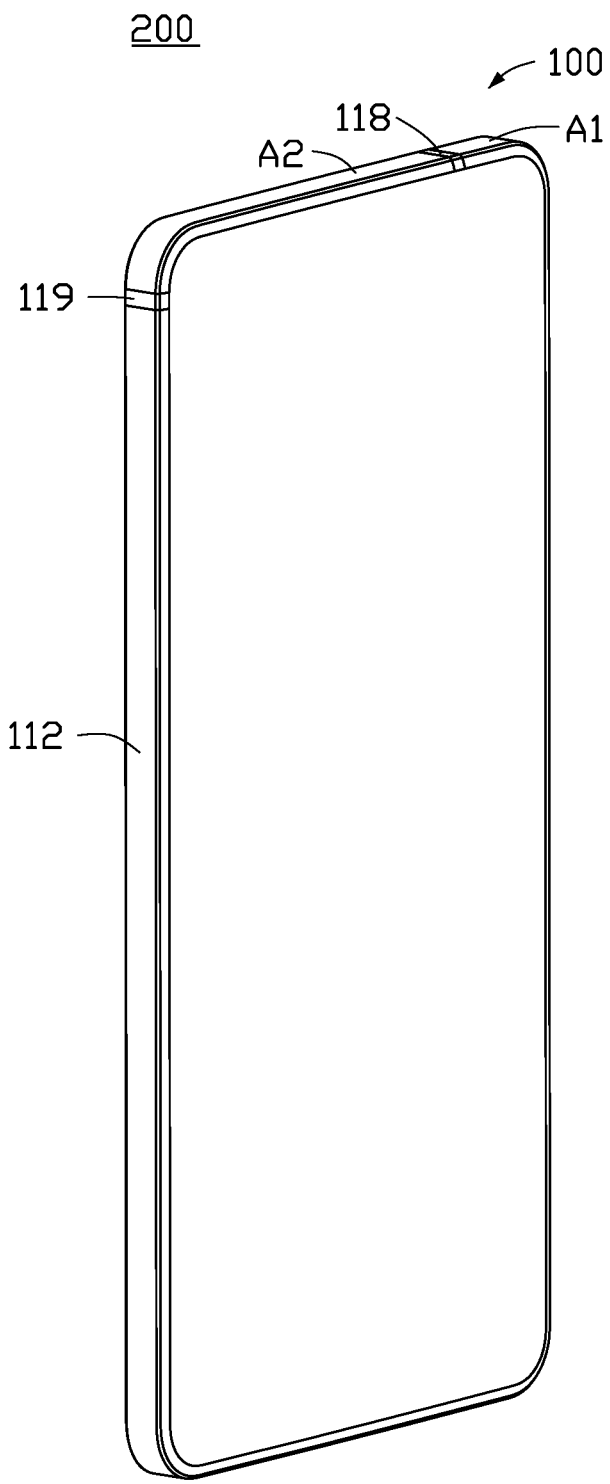
FIG. 1 is an isometric view of an embodiment of a wireless communication device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better show details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an antenna apparatus and a wireless communication device using same.

FIG. 1 shows an embodiment of a wireless communication device 200 using a first antenna apparatus 100. The wireless communication device 200 can be, for example, a mobile phone or a personal digital assistant. The antenna apparatus 100 can receive and send wireless signals.

Figure 2:
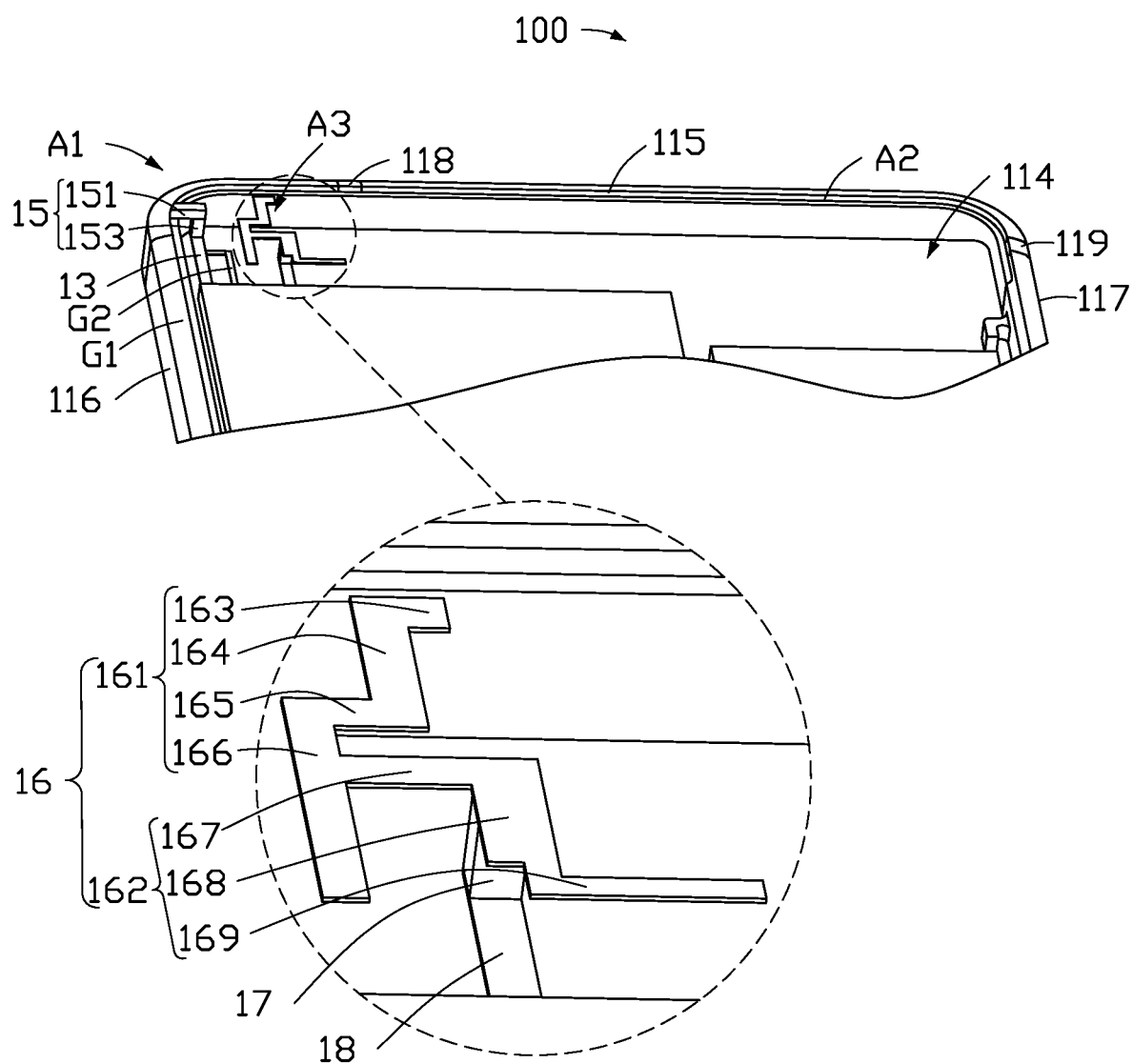
FIG. 2 is an isometric view of an embodiment of the antenna apparatus of the wireless communication device of FIG. 1.
Figure 3:
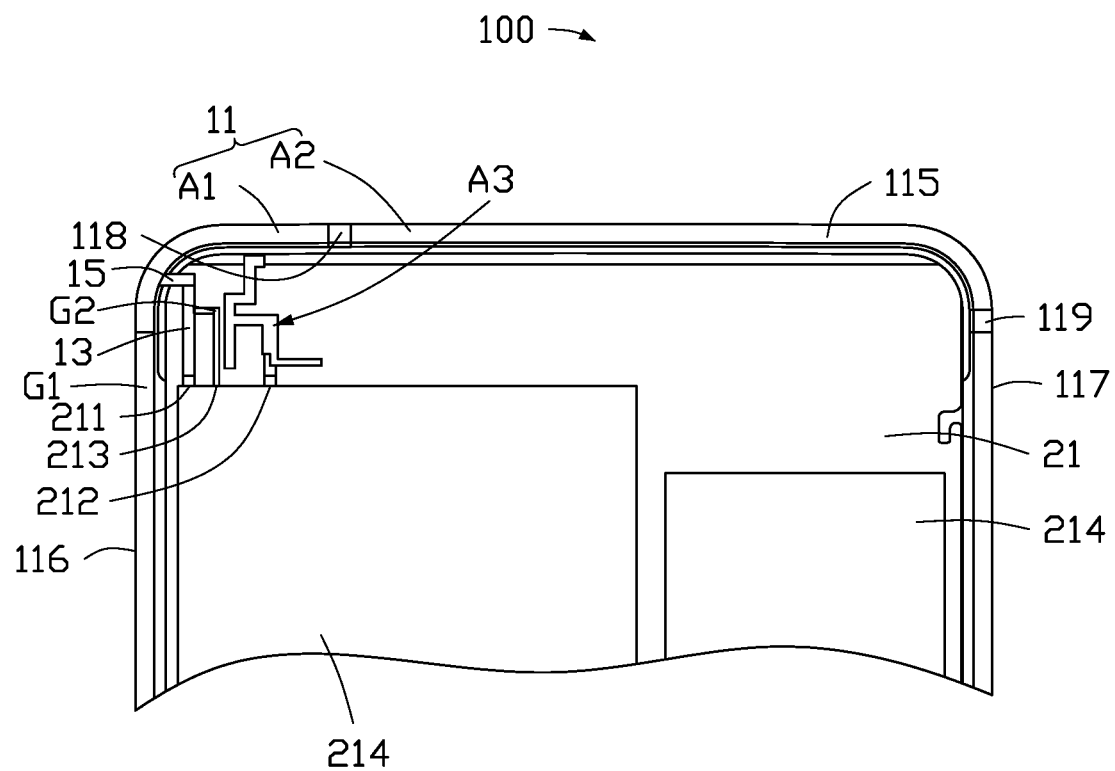
FIG. 3 is a planar view of the first embodiment of the antenna apparatus of FIG. 2.

FIGS. 2 and 3 show that the wireless communication device 200 further includes a base board 21, made of dielectric materials, such as epoxy glass fiber (FR4). The base board 21 includes a first feed point 211, a second feed point 212, and a first ground point 213. The first feed point 211, the second feed point 212, and the first ground point 213 are spaced from each other and arranged on the base board 21. The first feed point 211 and the second feed point 212 feed current and signals to the antenna apparatus 100. The first ground point 213 grounds the antenna apparatus 100. The base board 21 further includes a metal shielding member 214 protecting the antenna apparatus 100 against electromagnetic interference caused by electronic elements, such as speaker, vibrator, and camera, on the base board 21.

The antenna apparatus 100 includes a housing 11, a first ground portion G1, and a first feed portion 13.

The housing 11 can be the shell of the wireless communication device 200. The housing 11 includes at least one side frame 112. In at least one embodiment, the side frame 112 can be made of metal material. The side frame 112 is a hollow frame. The housing 11 further includes a back board 113 (shown in FIG. 4). The back board 113 is positioned beside the side frame 112. The back board 113 forms a receiving space 114 together with the side frame 112. The receiving space 114 can receive the base board 21, a processing unit (not shown), and other electronic components or modules. The side frame 112 is positioned beside a front cover (not shown) on another side. The front cover may support a display (not shown).

The side frame 113 includes a top portion 115, a first side portion 116, and a second side portion 117. The top portion 115 may also a top of the wireless communication device 200. The first side portion 116 is spaced apart from and parallel to the second side portion 117. The first side portion 116 and the second side portion 117 are connected to opposite ends of the top portion 115.

The side frame 112 defines a first gap 118 and a second gap 119. In at least one embodiment, the first gap 118 is defined on the top portion 115 and adjacent to the first side portion 116. The second gap 119 is defined on the top portion 115 and adjacent to the second side portion 117. The first gap 118 and the second gap 119 extend across and divide the side frame 112. The first gap 118 divides the side frame 112 into a first antenna A1 and a second antenna A2. In detail, a section of the top portion 115 between the first gap 118 and the first side portion 116 and a section of the first side portion 116 forms the first antenna A1. A section of the side frame 112 between the first gap 118 and the second gap 119 forms the second antenna A2. In at least one embodiment, a width of the first gap can be 2 millimeters, a length of the first antenna A1 can be 24.6 millimeters, and a length of the second antenna A2 can be 60 millimeters.

In this embodiment, the gaps 118, 119 are filled with insulating material, for example, plastic, rubber, glass, wood, ceramic, or the like.

The first ground portion G1 extends from an end of the first antenna A1 away from the first gap 118. The first antenna A1 is electrically connected to the first feed point 211 through the first feed portion 13, thereby forming a planar inverted-F antenna (PIFA).

In another embodiment, the first feed portion 13 can be arranged on an end of the first antenna A1 that is adjacent to the first gap 118, thereby forming a loop antenna.

The antenna apparatus 100 further includes a first connecting portion 15. A plane of the first connecting portion 15 is perpendicular to a plane of the first feed portion 13. In at least one embodiment, the first connecting portion 15 is substantially L-shaped and includes a first connecting section 151 and a second connecting section 153. The second connecting section 153 is perpendicularly connected to the first connecting section 151. An end of the first connecting section 151 is connected to the first antenna A1, an end of the second connecting section 153 is connected to the first feed portion 13.

FIG. 2 shows that in at least one embodiment, the antenna apparatus 100 further includes a third antenna A3. The third antenna A3 includes a radiating portion 16, a second connecting portion 17, and a second feed portion 18. The radiating portion 16 is arranged in the side frame 112. The radiating portion 16 is electrically connected to the second feed point 212 through the second connecting portion 17 and the second feed portion 18.

In at least one embodiment, the second feed portion 18 is parallel to the plane of the radiating portion 16. The second connecting portion 17 is perpendicularly connected between the radiating portion 16 and the second feed portion 18.

The radiating portion 16 includes a first beam portion 161 and a second beam portion 162. The second beam portion 162 is perpendicularly connected to the first beam portion 161. The first beam portion 161 includes a first radiating section 163, a second radiating section 164, a third radiating section 165, and a fourth radiating section 166. The first radiating section 163 is a straight sheet. The first radiating section 163 is parallel to the top portion 115 and extends adjacent to the first side portion 116. The second radiating section 164 is a straight sheet. One end of the second radiating section 164 is perpendicularly connected to an end of the first radiating section 163. The second radiating section 164 extends parallel to the first side portion 116 and away from the top portion 115, thereby the second radiating section 164 and the first radiating section 163 are L-shaped.

The third radiating section 165 is a straight sheet. One end of the third radiating section 165 is perpendicularly connected to an end of the second radiating section 164 away from the first radiating section 163. The third radiating section 165 extends parallel to the first radiating section 163 but in opposite direction. In at least one embodiment, the first radiating section 163 and the third radiating section 165 are perpendicularly connected to opposite ends of the second radiating section 164.

The fourth radiating section 166 is a straight sheet. One end of the fourth radiating section 166 is perpendicularly connected to an end of the third radiating section 165 away from the second radiating section 164. The fourth radiating section 166 extends parallel to the second radiating section 164 and in same direction. In at least one embodiment, the second radiating section 164 and the fourth radiating section 166 are perpendicularly connected to opposite ends of the third radiating section 165. A length of the fourth radiating section 166 is greater than a length of the second radiating section 164.

The second beam portion 162 includes a first beam section 167, a second beam portion 168, and a third beam portion 169. The first beam section 167, the second beam portion 168, and the third beam portion 169 are connected in that order. The first beam section 167 is a straight sheet. One end of the first beam section 167 is perpendicularly connected to the fourth radiating section 166. The first beam section 167 extends from the fourth radiating section 166 in a direction towards the second side portion 117 and parallel to the third radiating section 165.

The second beam portion 168 is a straight sheet. One end of the second beam portion 168 is perpendicularly connected to an end of the first beam section 167 away from the fourth radiating section 166. The second beam portion 168 extends from the first beam section 167 in a direction away from the top portion 115. The third beam portion 169 is a straight sheet. One end of the third beam portion 169 is perpendicularly connected to an end of the second beam portion 168 away from the first beam section 167. The third beam portion 169 extends from the second beam portion 168 and is parallel to the first beam section 167.

In at least one embodiment, the first beam section 167 and the third beam portion 169 are perpendicularly connected to opposite ends of the second beam portion 168. A width of the second beam portion 168 is greater than a width of the first beam section 167 and a width of the third beam portion 169. In at least one embodiment, the second beam portion 168 is electrically connected to the second feed point 212 through the second connecting portion 17 and the second feed portion 18.

Figure 5:
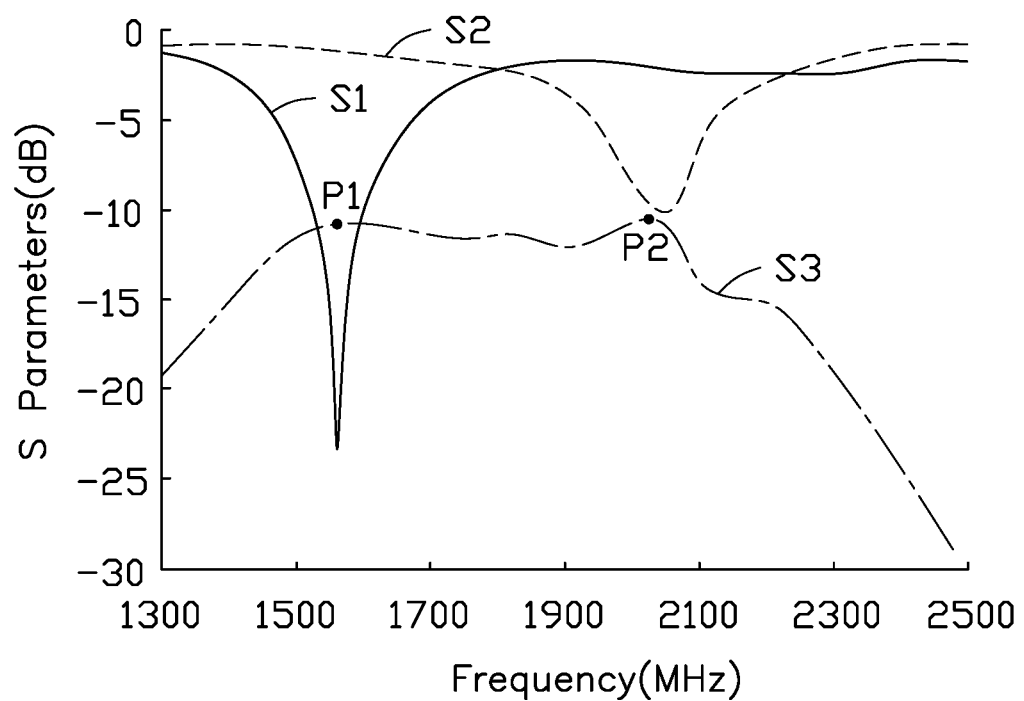
FIG. 5 is an s-parameter graph of the antenna apparatus of FIG. 2 in operation without a second ground portion.

In at least one embodiment, the first antenna A1 is a GPS antenna, the third antenna A3 is a diversity antenna. In FIG. 5, curve S1 is a return loss (RL) graph of the first antenna A1, curve S2 is a return loss graph of the third antenna A3, and curve S3 is an isolation graph of the first antenna A1 and the third antenna A3. An isolation is −11 dB when the first antenna A1 and the third antenna A3 are at a frequency point P1 of 1575 MHz. An isolation is −10.5 dB when the first antenna A1 and the third antenna A3 are at a frequency point P2 of 2050 MHz.

In FIG. 2, to improve the isolation of the first antenna A1 and the third antenna A3, the first antenna A1 further includes a second ground portion G2. In at least one embodiment, one end of the second ground portion G2 is connected to the first feed portion 13, another end is electrically connected to the first ground point 213. The first ground portion G1 and the second ground portion G2 are arranged on opposite sides of the first feed portion 13. In other embodiments, the second ground portion G2 can be other shapes or structures.

Figure 7:
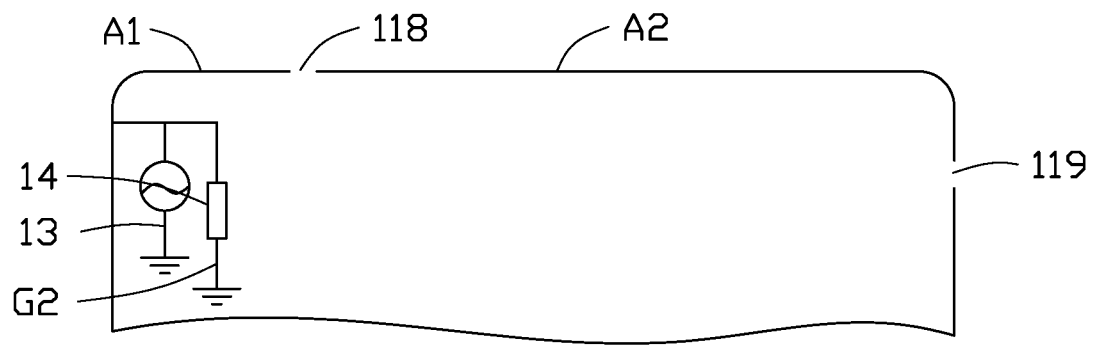
FIG. 7 is a circuit diagram of the antenna apparatus of FIG. 2 without a third antenna.

The second ground portion G2 further includes a load element 14 (shown in FIG. 7). The first antenna A1 is electrically connected to the first ground point 213 through the load element 14 and the second ground portion G2. The load element 14 can be a resistor, an inductor, a capacitor, or a combination of the resistor, the inductor and the capacitor. In this embodiment, FIG. 7 shows an equivalent circuit of the antenna apparatus 100.

In other embodiments, the first antenna A1 and the third antenna A3 can be a combination of a GPS antenna and a WI-FI antenna, a WI-FI antenna and a diversity antenna, or WI-FI MIMO (Multiple-Input Multiple-Output) antenna.

Figure 6:
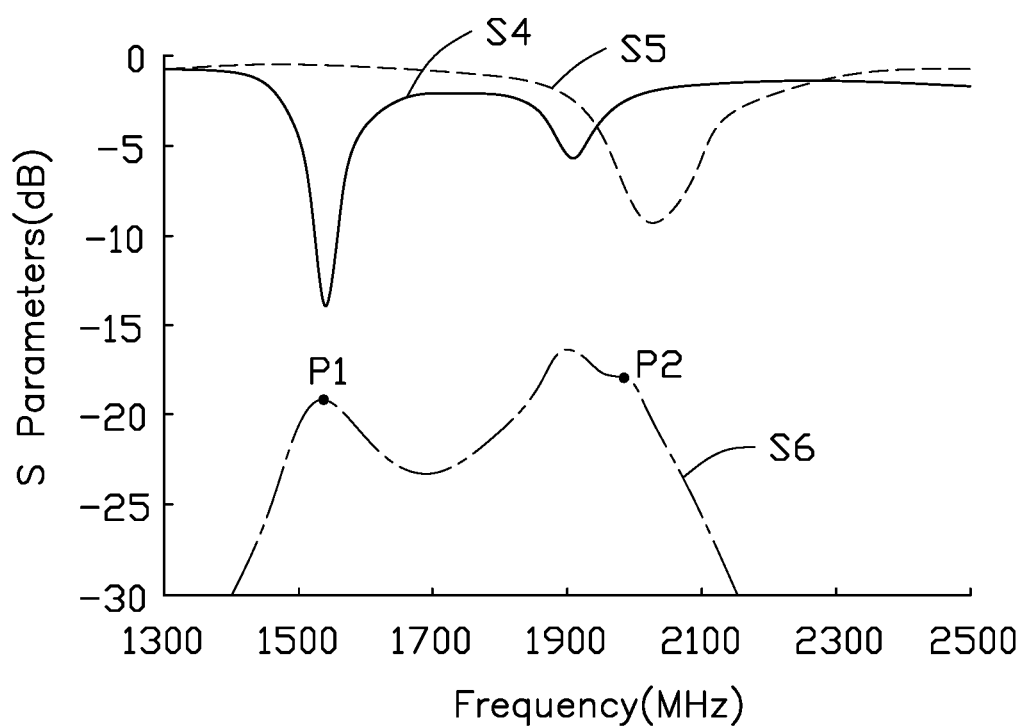
FIG. 6 is an s-parameter graph of the antenna apparatus of FIG. 2 in operation.
Figure 8:
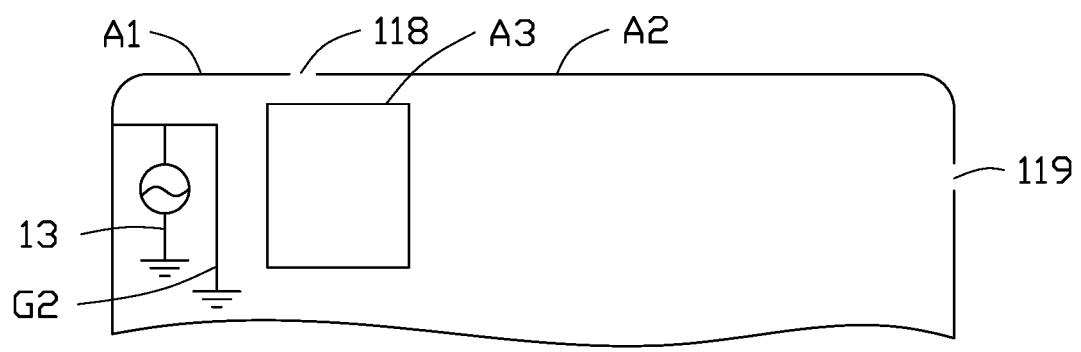
FIG. 8 is a circuit diagram of the antenna apparatus of FIG. 2.

In FIG. 6, curve S4 is a return loss graph of the first antenna A1 of the antenna apparatus 100 of FIG. 8. Curve S5 is a return loss graph of the third antenna A3 of the antenna apparatus 100 of FIG. 8 and curve S6 is an isolation graph of the first antenna A1 and the third antenna A3 of the antenna apparatus 100 of FIG. 8. An isolation is −19 dB when the first antenna A1 and the third antenna A3 are at a frequency point P1 and an isolation is −18 dB when the first antenna A1 and the third antenna A3 are at a frequency point P2. The isolations of the first antenna A1 and the third antenna A3 are thereby improved, and the radiation efficiency of the antenna apparatus 100 is significantly better. Hence, by adding the second ground portion G2, the isolation of the first antenna A1 and other antennas, such as the third antenna A3, can be improved, and cross-interference between the antennas is decreased. The radiation efficiency of the antennas is improved, and directivity antenna pattern is obtained.

Figure 9:
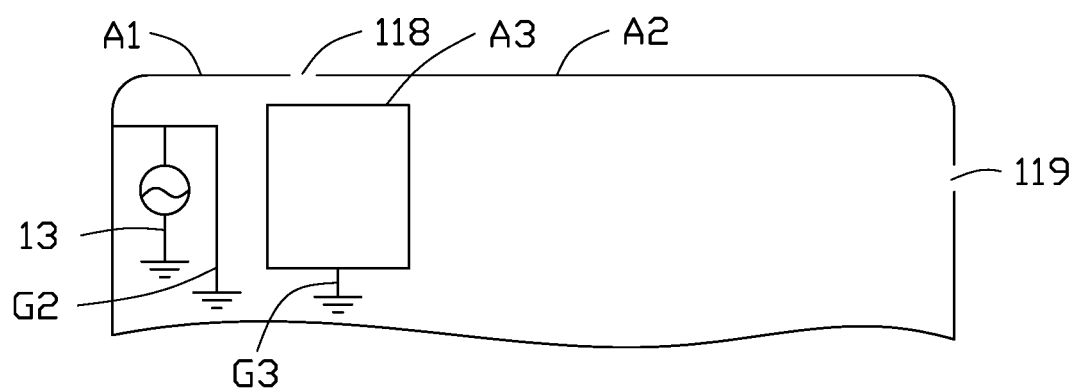
FIG. 9 is a circuit diagram of the antenna apparatus of FIG. 2 when the third antenna is grounded.

FIG. 9 shows, to improve the isolation of the first antenna A1 and the third antenna A3, the third antenna A3 further includes a third ground portion G3. A structure of the third ground portion G3 can be substantially similar to the structure of the second ground portion G2. One end of the third ground portion G3 is connected to the second feed portion 18, other end is grounded. In this embodiment, FIG. 9 shows an equivalent circuit of the antenna apparatus 100.

Figure 10:
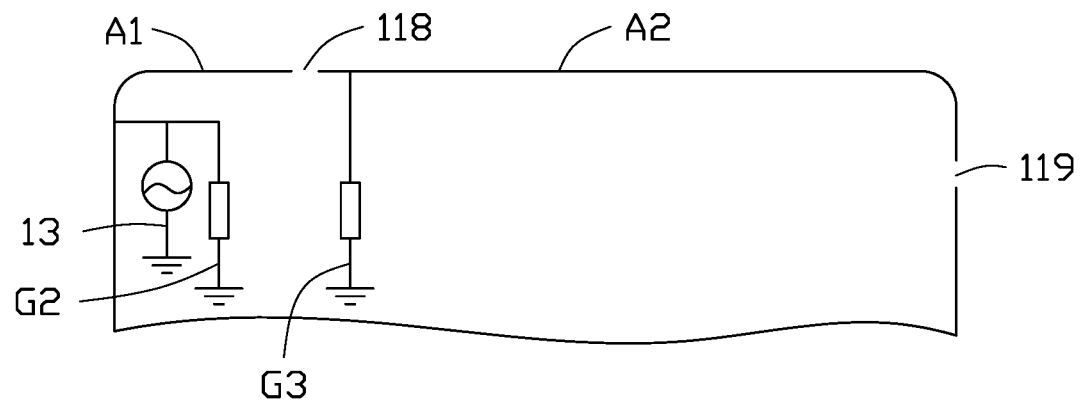
FIG. 10 is a circuit diagram of the antenna apparatus of FIG. 2 without the third antenna and when the second antenna is grounded.

In other embodiments, the third ground portion G3 can be connected to the second antenna A2, thus improving isolation between the first antenna A1 and the third antenna A3. In this embodiment, FIG. 10 shows an equivalent circuit of the antenna apparatus 100.

Figure 11:
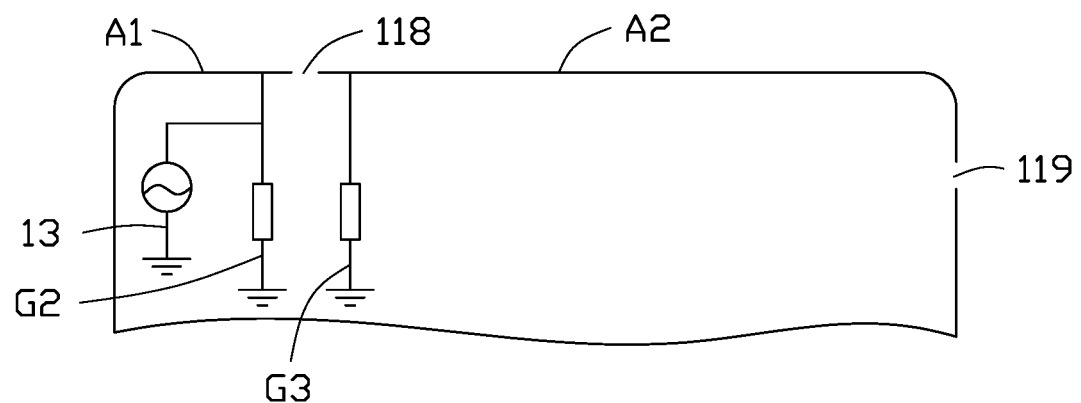
FIG. 11 is a circuit diagram of another embodiment of the antenna apparatus of FIG. 2 without the third antenna and when the second antenna is grounded.

In other embodiments, the second ground portion G2 and the third ground portion G3 can be connected to opposite sides of the first gap 118, and the first feed portion 13 can be connected to an end of the first antenna A1 adjacent to the first gap 118. In this embodiment, FIG. 11 shows an equivalent circuit of the antenna apparatus 100.

Figure 4:
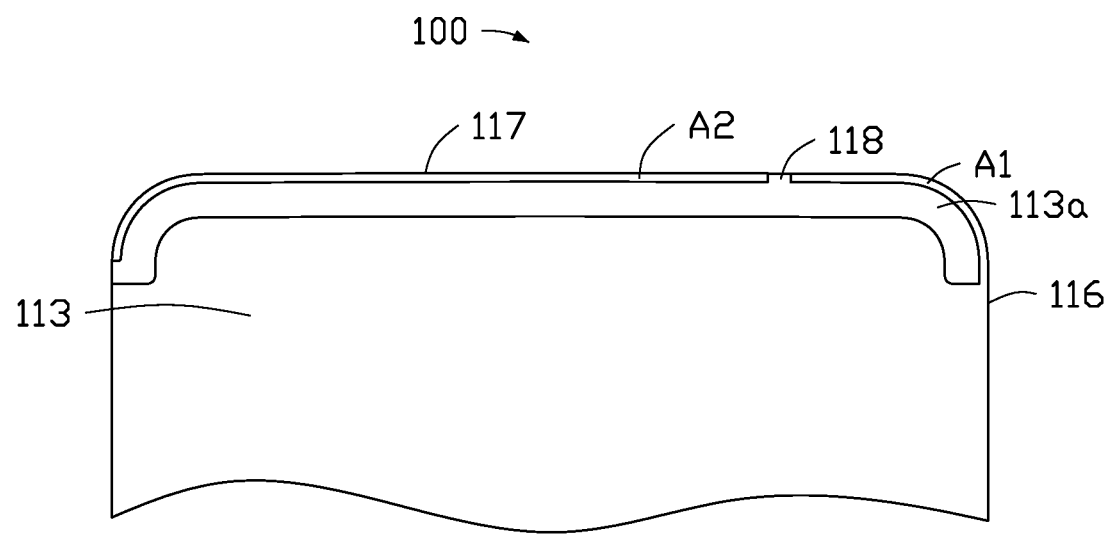
FIG. 4 is another planar view of the first embodiment of the antenna apparatus of FIG. 2.

FIG. 4 shows, in order to separate the first antenna A1 and the second antenna A2 from other parts of the housing 11, a slot 113a is defined between the back board 113 and the side frame 112. In at least one embodiment, the slot 113a is substantially U-shaped and has a width of about 2 millimeters. The slot 113a is filled with insulating material, for example, plastic, rubber, glass, wood, ceramic, or the like.

The antenna apparatus 100 includes two or more ground paths between the side frame 112 and the base board 21, by rearranging the second ground portion G2 and the third ground portion G3, to improve the isolation between the antennas.

As described above, embodiments of the invention are concerned with physically connecting an electronic device with an antenna to overcome some or all of the disadvantages associated with connecting an antenna with a remotely located electronic device. Specifically, embodiments of the invention provide a novel arrangement of an antenna apparatus and electronic components which interface with the antenna apparatus so as to input and output signals transceived therefrom.

The embodiments shown and described above are only examples. Many details are often found in the art such as the other features of the antenna. Therefore, many such details are neither shown nor described. Even though numerous characteristics and advantages of the present disclosure have been set forth in the foregoing description, together with details of the structure and function of the present disclosure, the disclosure is illustrative only, and changes may be made in the details, especially in matters of shape, size and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna apparatus comprising:
    a housing, the housing comprising a side frame, the side frame defining at least one gap, the at least one gap dividing the side frame to form a first antenna and a second antenna;
    a first ground portion, the first ground portion formed by extending an end of the first antenna away from the at least one gap;
    a first feed portion;
    a second ground portion, wherein the second ground portion comprises a first end directly connected to the first feed portion, and a second end connected to a first ground point;
    a first connecting portion; and
    a third antenna, the third antenna comprising a radiating portion, a second connecting portion, a second feed portion, and a third ground portion, the radiating portion being electrically connected to a second feed point through the second connecting portion and the second feed portion, the radiating portion being grounded through the third ground portion; wherein the radiating portion is arranged in the side frame and comprises a first beam portion and a second beam portion; the second beam portion is perpendicularly connected to the first beam portion;
    wherein the first connecting portion is connected between the first antenna and the first feed portion, the first antenna is electrically connected to a first feed point through the first connecting portion and the first feed portion.

2. The antenna apparatus of claim 1, wherein the first ground portion and the second ground portion are arranged on opposite sides of the first feed portion.

3. The antenna apparatus of claim 1, wherein the second ground portion comprises a load element, the first antenna is electrically connected to the first ground point through the load element, the load element is a resistor, an inductor, a capacitor, or a combination of the resistor, the inductor and the capacitor.

4. The antenna apparatus of claim 1, wherein a plane of the first connecting portion is perpendicular to a plane of the first feed portion.

5. The antenna apparatus of claim 4, wherein the first connecting portion comprises a first connecting section and a second connecting section, and the second connecting section is perpendicularly connected to the first connecting section; wherein an end of the first connecting section is connected to the first antenna, an end of the second connecting section is connected to the first feed portion.

6. The antenna apparatus of claim 1, wherein the second feed portion is parallel to the plane of the radiating portion; the second connecting portion is perpendicularly connected between the radiating portion and the second feed portion.

7. The antenna apparatus of claim 1, wherein the first beam portion includes a first radiating section, a second radiating section, a third radiating section, and a fourth radiating section; the first radiating section, the second radiating section, the third radiating section, and the fourth radiating section are straight sheets; one end of the second radiating section is perpendicularly connected to an end of the first radiating section, therefore the second radiating section and the first radiating section form a L-shaped; one end of the third radiating section is perpendicularly connected to an end of the second radiating section away from the first radiating section; the third radiating section extends parallel to the first radiating section but in opposite direction; the first radiating section and the third radiating section are perpendicularly connected to opposite ends of the second radiating section; one end of the fourth radiating section is perpendicularly connected to an end of the third radiating section away from the second radiating section; the fourth radiating section extends parallel to the second radiating section and in a same direction; the second radiating section and the fourth radiating section are perpendicularly connected to opposite ends of the third radiating section; a length of the fourth radiating section is greater than a length of the second radiating section.

8. The antenna apparatus of claim 1, wherein the housing further comprises a back board positioned on one side of the side frame, and a slot is defined between the back board and the side frame.

9. The antenna apparatus of claim 1, wherein the side frame is made of metal, the side frame defines a first gap and a second gap, the first gap divides the side frame into the first antenna and the second antenna, a section of the side frame between the first gap and the second gap forms the second antenna; the first gap and the second gap are filled with insulating material.

10. A wireless communication device, comprising:
a housing, the housing comprising a side frame, the side frame defining at least one gap, the at least one gap dividing the side frame to form a first antenna and a second antenna;
a base board, the base board is arranged in the housing and comprising a first ground point and a first feed point;
a first ground portion, the first ground portion formed by extending an end of the first antenna away from the at least one gap;
a first feed portion;
a second ground portion, wherein the second ground portion comprises a first end directly connected to the first feed portion, and a second end connected to the first ground point;
a first connecting portion; and
a third antenna, the third antenna comprising a radiating portion, a second connecting portion, a second feed portion, and a third ground portion, the radiating portion being electrically connected to a second feed point through the second connecting portion and the second feed portion, the radiating portion being grounded through the third ground portion; wherein the radiating portion is arranged in the side frame and comprises a first beam portion and a second beam portion; the second beam portion is perpendicularly connected to the first beam portion;
wherein the first connecting portion is connected between the first antenna and the first feed portion, the first antenna is electrically connected to the first feed point through the first connecting portion and the first feed portion.

11. The wireless communication device as claim 10, wherein the first ground portion and the second ground portion are arranged on opposite sides of the first feed portion.

12. The wireless communication device as claim 10, wherein the second ground portion comprises a load element, the first antenna is electrically connected to the first ground point through the load element, the load element is a resistor, an inductor, a capacitor, or a combination of the resistor, the inductor and the capacitor.

13. The wireless communication device as claim 10, wherein a plane of the first connecting portion is perpendicular to a plane of the first feed portion.

14. The antenna apparatus of claim 13, wherein the first connecting portion comprises a first connecting section and a second connecting section, and the second connecting section is perpendicularly connected to the first connecting section; wherein an end of the first connecting section is connected to the first antenna, an end of the second connecting section is connected to the first feed portion.

15. The wireless communication device as claim 10, wherein the second feed portion is parallel to the plane of the radiating portion; the second connecting portion is perpendicularly connected between the radiating portion and the second feed portion.

16. The wireless communication device as claim 10, wherein the first beam portion includes a first radiating section, a second radiating section, a third radiating section, and a fourth radiating section; the first radiating section, the second radiating section, the third radiating section, and the fourth radiating section are straight sheets; one end of the second radiating section is perpendicularly connected to an end of the first radiating section, therefore the second radiating section and the first radiating section form a L-shaped; one end of the third radiating section is perpendicularly connected to an end of the second radiating section away from the first radiating section; the third radiating section extends parallel to the first radiating section but in opposite direction; the first radiating section and the third radiating section are perpendicularly connected to opposite ends of the second radiating section; one end of the fourth radiating section is perpendicularly connected to an end of the third radiating section away from the second radiating section; the fourth radiating section extends parallel to the second radiating section and in a same direction; the second radiating section and the fourth radiating section are perpendicularly connected to opposite ends of the third radiating section; a length of the fourth radiating section is greater than a length of the second radiating section.

17. The wireless communication device as claim 10, wherein the housing further comprises a back board positioned on one side of the side frame, and a slot is defined between the back board and the side frame.

18. The wireless communication device as claim 10, wherein the side frame is made of metal, the side frame defines a first gap and a second gap, the first gap divides the side frame into the first antenna and the second antenna, a section of the side frame between the first gap and the second gap forms the second antenna; the first gap and the second gap are filled with insulating material.

* * * * *